(12) United States Patent
Schumacher et al.

(10) Patent No.: US 11,455,912 B2
(45) Date of Patent: Sep. 27, 2022

(54) ELECTRONIC SHELF-TAG SYSTEMS AND METHODS THEREOF

(71) Applicant: Adroit Worldwide Media, Inc., Aliso Viejo, CA (US)

(72) Inventors: Greg Schumacher, Aliso Viejo, CA (US); Kevin Howard, Aliso Viejo, CA (US)

(73) Assignee: Adroit Worldwide Media, Inc., Aliso Viejo, CA (US)

( * ) Notice: Subject to any disclaimer, the term of this patent is extended or adjusted under 35 U.S.C. 154(b) by 0 days.

(21) Appl. No.: 16/562,725

(22) Filed: Sep. 6, 2019

(65) Prior Publication Data

US 2020/0082740 A1 Mar. 12, 2020

Related U.S. Application Data

(60) Provisional application No. 62/728,681, filed on Sep. 7, 2018.

(51) Int. Cl.
*G09F 3/20* (2006.01)
*G06Q 30/02* (2012.01)
*G06Q 30/06* (2012.01)
*G09G 3/32* (2016.01)
*H04W 4/80* (2018.01)
*G08B 5/36* (2006.01)

(52) U.S. Cl.
CPC ......... *G09F 3/208* (2013.01); *G06Q 30/0268* (2013.01); *G06Q 30/0643* (2013.01); *G08B 5/36* (2013.01); *G09G 3/32* (2013.01); *H04W 4/80* (2018.02); *G09G 2380/04* (2013.01)

(58) Field of Classification Search
CPC .............................. G09F 3/208; G06Q 30/0268
See application file for complete search history.

(56) References Cited

U.S. PATENT DOCUMENTS

| | | | |
|---|---|---|---|
| 9,990,644 B2 | 6/2018 | Walden | |
| 10,373,189 B2 | 8/2019 | Walden | |
| 10,373,190 B2 | 8/2019 | Walden | |
| 10,453,362 B2 * | 10/2019 | Bottine | G09F 3/204 |
| 2002/0034067 A1 | 3/2002 | Massaro | |
| 2008/0255894 A1 | 10/2008 | Falls et al. | |
| 2011/0094975 A1 * | 4/2011 | Hardy | A47F 5/0068 |
| | | | 211/4 |

(Continued)

OTHER PUBLICATIONS

International Search Report and Written Opinion, PCT Application No. PCT/US2019/049868, dated Nov. 12, 2019.

*Primary Examiner* — Gary C Hoge
(74) *Attorney, Agent, or Firm* — Ravi Mohan; Rutan & Tucker, LLP

(57) ABSTRACT

Disclosed herein are electronic shelf-tag systems and methods thereof. For example, an electronic shelf-tag system includes, in some embodiments a fascia configured to mount to a shelf of a shelving unit and a light-emitting diode ("LED") array coupled to the fascia. The LED array is configured to display product information in a shared electronic shelf tag for two or more products respectively stocked in two or more consecutive shelf slots when a horizontal resolution of a portion of the LED array corresponding to at least one shelf slot of the two or more consecutive shelf slots is insufficient for displaying the product information for the product stocked in the at least one shelf slot.

13 Claims, 11 Drawing Sheets

(56) References Cited

U.S. PATENT DOCUMENTS

| | | |
|---|---|---|
| 2014/0249928 A1 | 9/2014 | McMillan et al. |
| 2016/0034244 A1* | 2/2016 | Howard ................ G06F 3/1446 345/156 |
| 2016/0132822 A1 | 5/2016 | Swafford |
| 2016/0371735 A1 | 12/2016 | Walden |
| 2017/0011427 A1 | 1/2017 | Walden |
| 2017/0011429 A1 | 1/2017 | Walden |
| 2017/0017290 A1 | 1/2017 | Walden |
| 2017/0017994 A1 | 1/2017 | Walden |
| 2017/0018004 A1 | 1/2017 | Walden |
| 2017/0018005 A1 | 1/2017 | Walden |
| 2017/0018006 A1 | 1/2017 | Walden |
| 2017/0019764 A1 | 1/2017 | Walden |
| 2017/0053315 A1 | 2/2017 | Walden |
| 2017/0053316 A1 | 2/2017 | Walden |
| 2017/0068978 A1 | 3/2017 | Walden |
| 2018/0242126 A1 | 8/2018 | Shah et al. |

* cited by examiner

ELECTRONIC SHELF-TAG SYSTEMS AND METHODS THEREOF

PRIORITY

This application claims the benefit of priority to U.S. Provisional Application No. 62/728,681, filed Sep. 7, 2018, which is incorporated by reference in its entirety herein.

BACKGROUND

Retail environments are ever challenging. Consumers are continuously confronted with overwhelming amounts of information for competing brands of products and services. Such information is often provided in some printed form such as printed slide-in or adhesive shelf tags including product information and pricing. However, such shelf tags can be difficult to read in retail environments due to small-sized print, poor lighting conditions, or the like. That, and the shelf tags are not always timely updated when a product is sold out or replaced with another product in the same shelf slot. Therefore, a continuing need exists for solutions that help retailers create intimate customer experiences and increase operational efficiencies. Provided herein are electronic shelf-tag systems and methods that address the foregoing.

SUMMARY

Disclosed herein is an electronic shelf-tag system including, in some embodiments a fascia configured to mount to a shelf of a shelving unit and a light-emitting diode ("LED") array coupled to the fascia. The LED array is configured to display product information in a shared electronic shelf tag for two or more products respectively stocked in two or more consecutive shelf slots when a horizontal resolution of a portion of the LED array corresponding to at least one shelf slot of the two or more consecutive shelf slots is insufficient for displaying the product information for the product stocked in the at least one shelf slot.

In some embodiments, the shared electronic shelf tag is configured to sequentially indicate each shelf slot of the two or more consecutive shelf slots by displaying a corresponding indicator.

In some embodiments, the shared electronic shelf tag is configured to sequentially display individualized product information for each product of the two or more products respectively stocked in the two or more consecutive shelf slots.

In some embodiments, the shared electronic shelf tag is configured to display the individualized product information for each product of the two or more products in one or more screens.

In some embodiments, the individualized product information for each product is displayed for about 3-10 seconds.

In some embodiments, the shared electronic shelf tag is configured to display a persistent sale price for each product of the two or more products respectively stocked in the two or more consecutive shelf slots.

In some embodiments, the electronic shelf-tag system further includes a proximity detection system configured to detect one or more persons proximate to the shelving unit. The LED array is configured to display at least the product information upon the proximity detection system detecting one or more persons proximate to the shelving unit.

In some embodiments, the electronic shelf-tag system is configured to automatically group the two or more products respectively stocked in the two or more consecutive shelf slots to share the shared electronic shelf tag.

In some embodiments, the electronic shelf-tag system is configured to accept operator input for manually grouping the two or more products respectively stocked in the two or more consecutive shelf slots to share the shared electronic shelf tag.

In some embodiments, the two or more products respectively stocked in the two or more consecutive shelf slots are three or more products respectively stocked in three or more consecutive shelf slots.

Also disclosed herein is an electronic shelf-tag system including, in some embodiments a fascia configured to mount to a shelf of a shelving unit, an LED array coupled to the fascia, and a proximity detection system configured to detect one or more persons proximate to the shelving unit. The LED array is configured to display product information in a shared electronic shelf tag for two or more products respectively stocked in two or more consecutive shelf slots when a horizontal resolution of a portion of the LED array corresponding to at least one shelf slot of the two or more consecutive shelf slots is insufficient for displaying the product information for the product stocked in the at least one shelf slot. The shared electronic shelf tag is configured to sequentially display individualized product information for each product of the two or more products respectively stocked in the two or more consecutive shelf slots. The shared electronic shelf tag is configured to display a persistent sale price for each product of the two or more products respectively stocked in the two or more consecutive shelf slots. The LED array is configured to display at least the product information upon the proximity detection system detecting one or more persons proximate to the shelving unit.

Also disclosed herein is a method of an electronic shelf-tag system including, in some embodiments, displaying product information in a shared electronic shelf tag on an LED array coupled to a fascia mounted to a shelf of a shelving unit. The product information is for two or more products respectively stocked in two or more consecutive shelf slots. A horizontal resolution of a portion of the LED array corresponding to at least one shelf slot of the two or more consecutive shelf slots is insufficient for displaying the product information for the product stocked in the at least one shelf slot.

In some embodiments, the method further includes sequentially indicating with the shared electronic shelf tag each shelf slot of the two or more consecutive shelf slots by displaying a corresponding indicator.

In some embodiments, the method further includes sequentially displaying with the shared electronic shelf tag individualized product information for each product of the two or more products respectively stocked in the two or more consecutive shelf slots.

In some embodiments, the method further includes displaying with the shared electronic shelf tag the individualized product information for each product of the two or more products in one or more screens. The individualized product information for each product is displayed for about 3-10 seconds.

In some embodiments, the method further includes displaying with the shared electronic shelf tag a persistent sale price for each product of the two or more products respectively stocked in the two or more consecutive shelf slots.

In some embodiments, the method further includes detecting one or more persons proximate to the shelving unit with a proximity detection system.

In some embodiments, the method further includes displaying on the LED array at least the product information upon the proximity detection system detecting one or more persons proximate to the shelving unit.

In some embodiments, the method further includes automatically grouping with the electronic shelf-tag system the two or more products respectively stocked in the two or more consecutive shelf slots to share the shared electronic shelf tag.

In some embodiments, the method further includes accepting by the electronic shelf-tag system operator input for manually grouping the two or more products respectively stocked in the two or more consecutive shelf slots to share the shared electronic shelf tag.

These and other features of the concepts provided herein will become more apparent to those of skill in the art in view of the accompanying drawings and following description, which disclose particular embodiments of such concepts in greater detail.

DRAWINGS

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

Disclosed herein are electronic shelf-tag systems and methods thereof. For example, an electronic shelf-tag system includes, in some embodiments a fascia configured to mount to a shelf of a shelving unit and an LED array coupled to the fascia. The LED array is configured to display product information in a shared electronic shelf tag for two or more products respectively stocked in two or more consecutive shelf slots when a horizontal resolution of a portion of the LED array corresponding to at least one shelf slot of the two or more consecutive shelf slots is insufficient for displaying the product information for the product stocked in the at least one shelf slot. However, before disclosing the electronic shelf-tag system in more detail, aspects of a smart-shelf system, of which the electronic shelf-tag system is part, will be disclosed.

Smart-Shelf Systems

Figure 1:
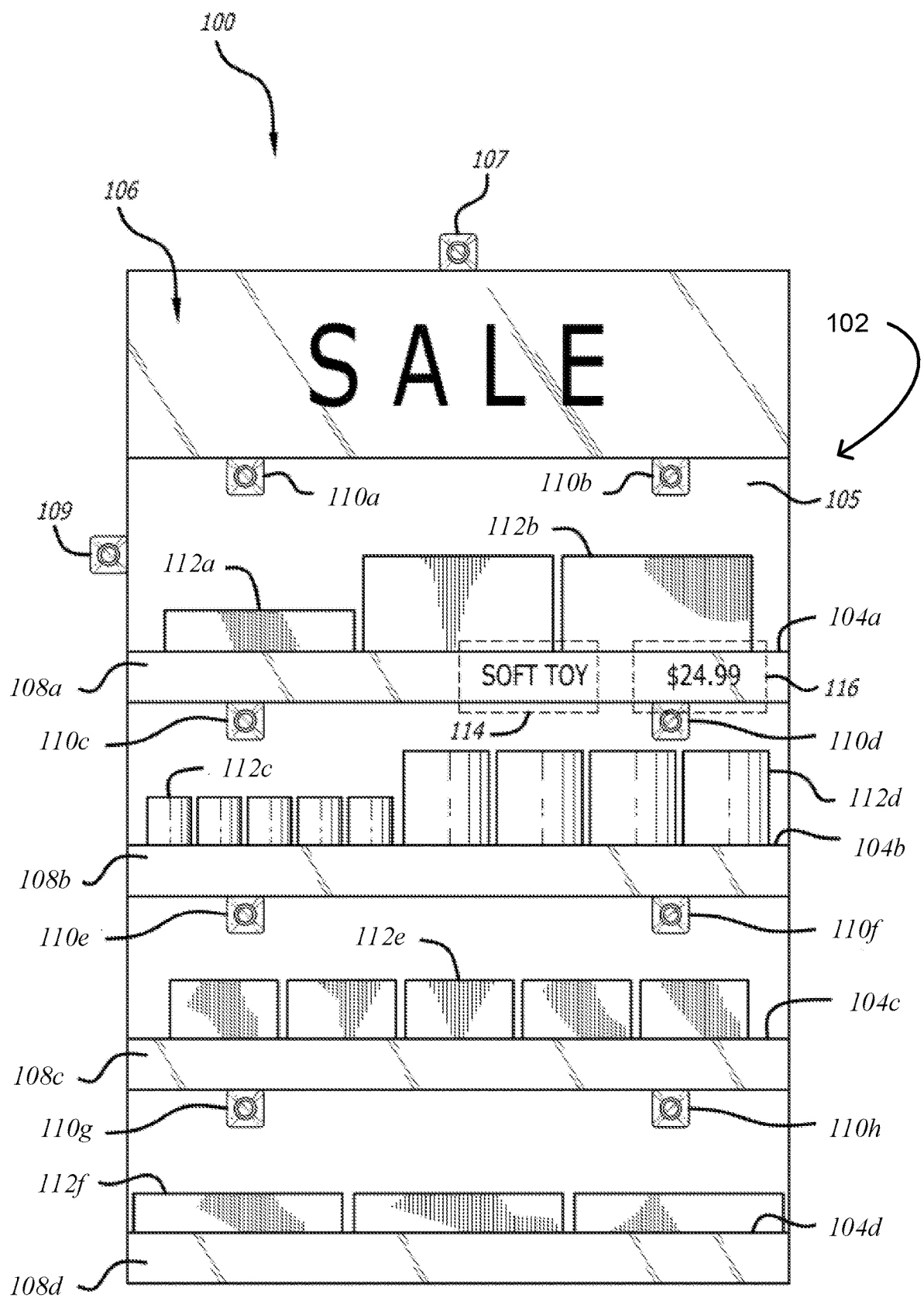
FIG. 1 illustrates a smart-shelf system in accordance with some embodiments.

Referring now to FIG. 1, an illustration of a smart-shelf system 100 in accordance with some embodiments is shown. The smart-shelf system 100 comprises a proximity camera 107, fasciae 108 (e.g., fascia 108a, fascia 108b, . . . , fascia 108n), a plurality of inventory cameras 110 (e.g., camera 110a, camera 110b, . . . , camera 110n) and a facial recognition camera 109. It is noted that the disclosure is not limited to the smart-shelf system 100 including a single cabinet display top 106 but can include a plurality of such cabinet top displays. Additionally, the smart-shelf system 100 is not limited to the number of fasciae, shelving units, proximity cameras, facial recognition cameras, or inventory cameras shown in FIG. 1. In some embodiments, the smart-shelf system 100 couples to a shelving unit 102, which includes shelves 104 (e.g., shelf 104a, shelf 104b, . . . , shelf 104n), a back component 105 (e.g., pegboard, gridwall, slatwall, etc.), and the cabinet top display 106.

In one embodiment, the cabinet display top 106 is coupled to an upper portion of the shelving unit 102, extending vertically from the back component 105. Further, the proximity camera 107 can be positioned on top of, or otherwise affixed to, the cabinet top display 106. Although the proximity camera 107 is shown in FIG. 1 as being centrally positioned atop the cabinet top display 106, the proximity camera 107 can be positioned in different locations, such as near either end of the top of the cabinet top 106, on a side of the cabinet top 106 or at other locations coupled to the shelving unit 102 or the fasciae 108.

The cabinet display top 106 and fasciae 108 can be attached to the shelves 104 by way of any fastening means deemed suitable, wherein examples include, but are not limited or restricted to, magnets, adhesives, brackets, hardware fasteners, and the like. The fasciae 108 and the cabinet display top 106 can each include one or more arrays of LEDs that are configured to display visual content (e.g., still or animated content), with optional speakers, not shown, coupled thereto to provide audio content. Any of the fasciae 108 or the cabinet display top 106 can include relatively smaller LED arrays that can be coupled together so as to tessellate the cabinet display top 106 and the fasciae 108 such that the fasciae 108 and cabinet top 106 desirably extend along the length of the shelves 104. The smaller LED arrays can be of any number of LED pixels, which can be organized into any arrangement to conveniently extend the cabinet display top 106 and the fasciae 108 along the length of a plurality of shelves 104. In some embodiments, for example, a first dimension of the smaller LED arrays can include about 132 or more pixels. In some embodiments, a second dimension of the smaller LED arrays can include about 62 or more pixels.

The cabinet display top 106 and the fasciae 108 can be configured to display visual content to attract the attention of potential customers. As shown in FIG. 1, the cabinet display top 106 can display desired visual content that extends along the length of the shelves 104. The desired content can include a single animated or graphical image that fills the entirety of the cabinet display top 106, or the desired content can be a group of smaller, multiple animated or graphical images that cover the area of the cabinet display top 106. In some embodiments, the fasciae 108 can cooperate with the cabinet display top 106 to display either a single image or multiple images that appear to be spread across the height, length, or both the height and length of the shelves 104.

In some embodiments, the cabinet display top 106 can display visual content selected to attract the attention of potential customers to one or more products comprising inventory 112 (e.g., various types of merchandise such as inventory 112a, inventory 112b, . . . , inventory 112n) located on the shelves 104. Thus, the visual content shown on the cabinet display top 106 can be specifically configured to draw the potential customers to approach the shelves 104. The visual content and is often related to the specific inventory 112 located on the corresponding shelves 104. A similar configuration with respect to visual content displayed on the fasciae 108 can apply as well, as will be discussed below. The content shown on the cabinet display top 106, as well as the fasciae 108, can be dynamically changed to engage and inform customers of ongoing sales, promotions, and advertising. As will be appreciated, these features offer brands and retailers a way to increase sales locally by offering customers a personalized campaign that can be easily changed quickly.

Moreover, as referenced above, portions of the fasciae 108 can display visual content such as images of brand names or symbols representing products stocked on the shelves 104 nearest to each portion of the fascia. For example, in an embodiment, a single fascia 108 can include a first portion 114 and a second portion 116. The first portion 114 can display an image of a brand name of inventory 112 that is stocked on the shelf above the first portion 114 (e.g., in one embodiment, stocked directly above the first portion 114), while the second portion 116 can display pricing information for the inventory 112. Additional portions can include an image of a second brand name or varied pricing information when such portions correspond to inventory different than inventory 112. It is contemplated, therefore, that the fasciae 108 extending along each of the shelves 104 can be sectionalized to display images corresponding to each of the products stocked on the shelves 104. It is further contemplated that the displayed images will advantageously simplify customers quickly locating desired products.

In an embodiment, the animated or graphical images displayed on the cabinet display top 106 and the fasciae 108 originate from media files that are executed by way of a suitable media player. The media player preferably is configured to simultaneously play any desired number of media files that can be displayed on the smaller LED arrays. In some embodiments, each of the smaller LED arrays can display one media file being executed by the multiplayer, such that a group of adjacent smaller LED arrays combine to display the desired images to the customer. Still, in some embodiments, base video can be stretched to fit any of various sizes of the smaller LED arrays or the cabinet display top 106 and fasciae 108. It should be appreciated, therefore, that the multiplayer disclosed herein enables implementing a single media player per aisle in-store instead relying on multiple media players dedicated to each aisle.

Figure 5:
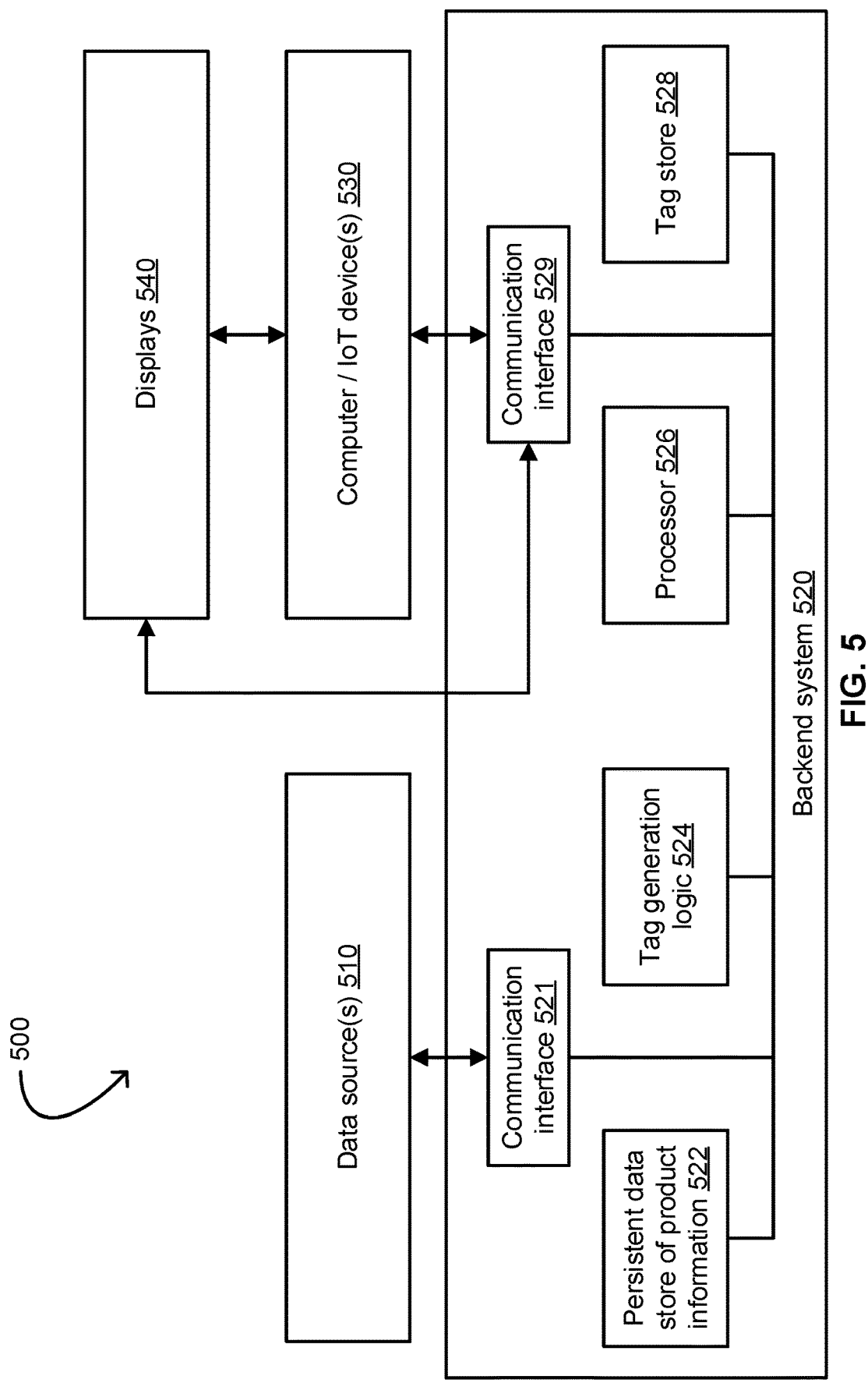
FIG. 5 illustrates a flow chart for generating and displaying shared electronic tags of an electronic shelf-tag system in accordance with some embodiments.

Furthermore, the inventory cameras 110 are coupled to the shelving unit 102 (e.g., by the pegboard 105) and positioned above inventory 112. Each inventory camera of the inventory cameras 110 is configured to monitor a portion of the inventory stocked on each shelf 104, and in some instances, can be positioned below a shelf 104 (e.g., as is shown with the inventory cameras 110c-110h). However, in some instances, an inventory camera 110 is not be positioned below a shelf 104 as is shown with the inventory cameras 110a and 110b. Taking the inventory camera 110d, as an example, the inventory camera 110d is positioned above the inventory portion 116 and therefore capable of (and configured to), monitor the inventory portion 116. Although, it should be noted that the inventory camera 110d can have a viewing angle of 180° (degrees) and is capable of monitoring a larger portion of the inventory 112 on the shelf 104b than merely inventory portion 116. For example, FIG. 5 illustrates one exemplary image captured by an inventory camera having a viewing of 180°.

In addition to the proximity camera 107 and the inventory cameras 110a-110h, the smart-shelf system 100 is can include the facial recognition camera 109. In one embodiment, the facial recognition camera 109 can be coupled to the exterior of the shelving unit 102. In some embodiments, the facial recognition camera 109 can positioned five to six feet from the ground in order to obtain a clear image of the faces of a majority of customers. The facial recognition camera 109 can be positioned at heights other than five to six feet from the ground. The facial recognition camera 109 need not be coupled to the exterior of the shelving unit 102 as illustrated in FIG. 1. The facial recognition camera 109 can be coupled to the interior of a side of the shelving unit 102 as well as to any portion of any of the shelves 104, the cabinet display top 106, the fasciae 108, or the back component 105 of the shelving unit 102. Further, a plurality of facial recognition cameras 109 can be coupled to the shelving unit 102.

In some embodiments, the smart-shelf system 100 can include one or more processors, a non-transitory computer-readable memory, one or more communication interfaces, and logic stored on the non-transitory computer-readable memory. The images or other data captured by the proximity camera 107, the facial recognition camera 109, or the inventory cameras 110 can be analyzed by the logic of the smart-shelf system 100. The non-transitory computer-readable medium can be local storage at the store in which the proximity camera 107, the facial recognition camera 109, or the inventory cameras 110a-110h reside, or can be cloud-computing storage. Similarly, the one or more processors can be local to the proximity camera 107, the facial recognition camera 109, or the inventory cameras 110a-110h or can be provided by cloud computing services.

Examples of the environment in which the smart-shelf system 100 can be located include, but are not limited or restricted to, a retailer, a warehouse, an airport, a high school, college or university, any cafeteria, a hospital lobby, a hotel lobby, a train station, or any other area in which a shelving unit for storing inventory can be located.

Figure 2:
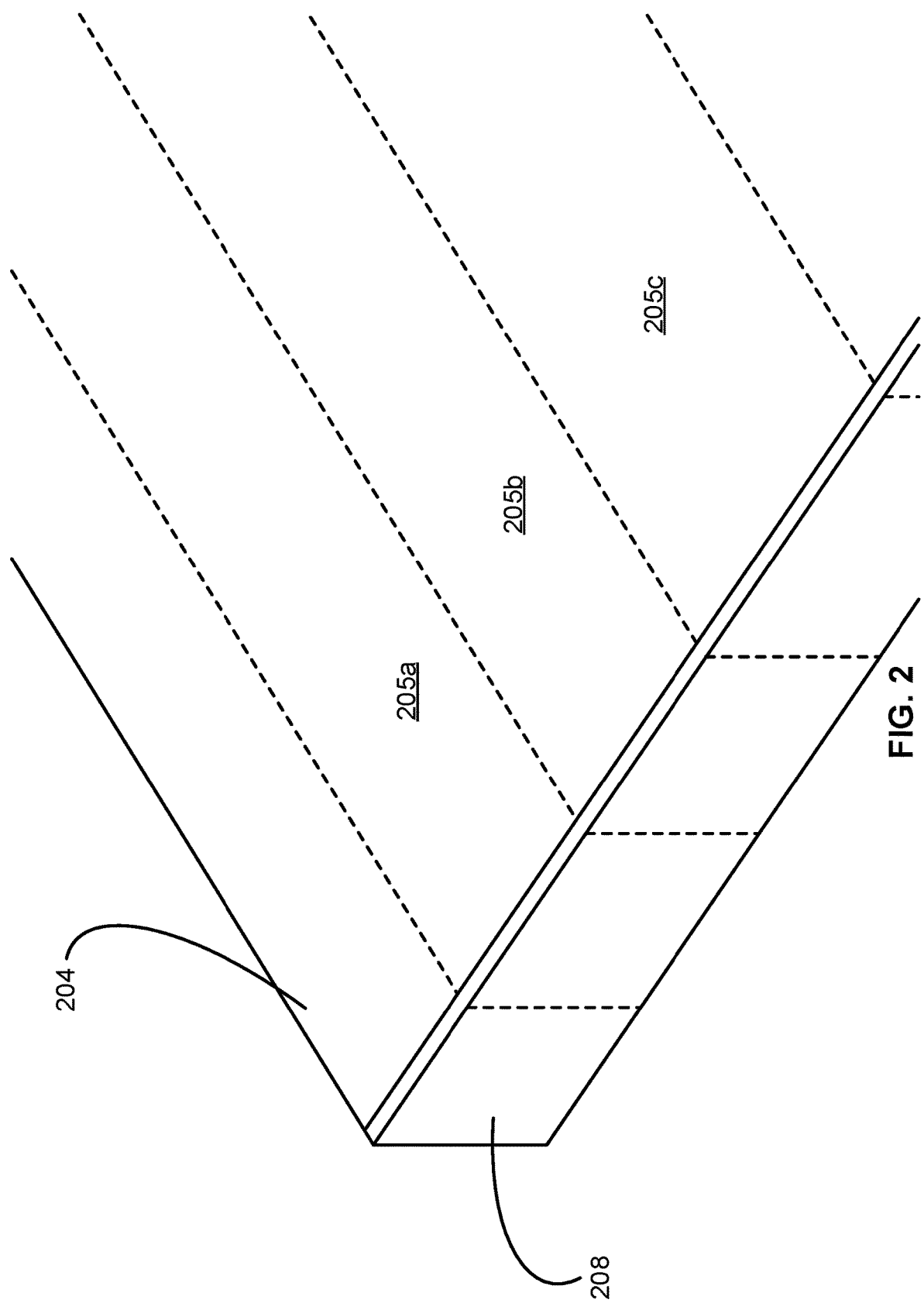
FIG. 2 illustrates a close-up view of a shelf of a shelving unit including a fascia in accordance with some embodiments.

FIG. 2 illustrates a close-up view of a shelf 204 of the shelving unit 102 including a fascia 208 in accordance with some embodiments.

As shown, the shelf 204 of shelving unit 102 includes the fascia 208 mounted to the shelf 204, wherein the fascia 208 includes an LED array integrated with or coupled to the fascia 208. The shelf 204 includes a number of shelf slots 205, which are shown in FIG. 2 by example as shelf slots 205a, 205b, and 205c. Each shelf slot of the number of shelf slots 205 can be configured for stocking a product for retail.

In order to utilize as much of a shelf as possible, shelf slots such as the shelf slots 205 of the shelf 204 are often designed to abut each other; however, it can be difficult to tag products in abutting shelf slots (e.g., shelf slots 205a and 205b) when the shelf slots are dimensioned for stocking relatively narrow products (e.g., see the inventory 112c of FIG. 1) such as cans of soup or the like. It can be particularly difficult to electronically tag such products with electronic shelf tags when the horizontal resolution of an LED array such as the LED array of the fascia 208 is limited. As such, the LED array of the fascia 208 can be configured to display product information in shared electronic shelf tags among two or more products respectively stocked in any two or more consecutive shelf slots (e.g., shelf slots 205a and 205b). A shared electronic shelf tag can be particularly useful when the horizontal resolution of a portion of the LED array corresponding to at least one shelf slot (e.g., shelf slot 205a or 205b) of the two or more consecutive shelf slots is insufficient for displaying the product information for the product stocked in the at least one shelf slot. That said, a shared electronic shelf tag can also be useful in at least visual merchandising two or more products respectively stocked in any two or more consecutive shelf slots regardless of product dimensions.

Figure 3A:
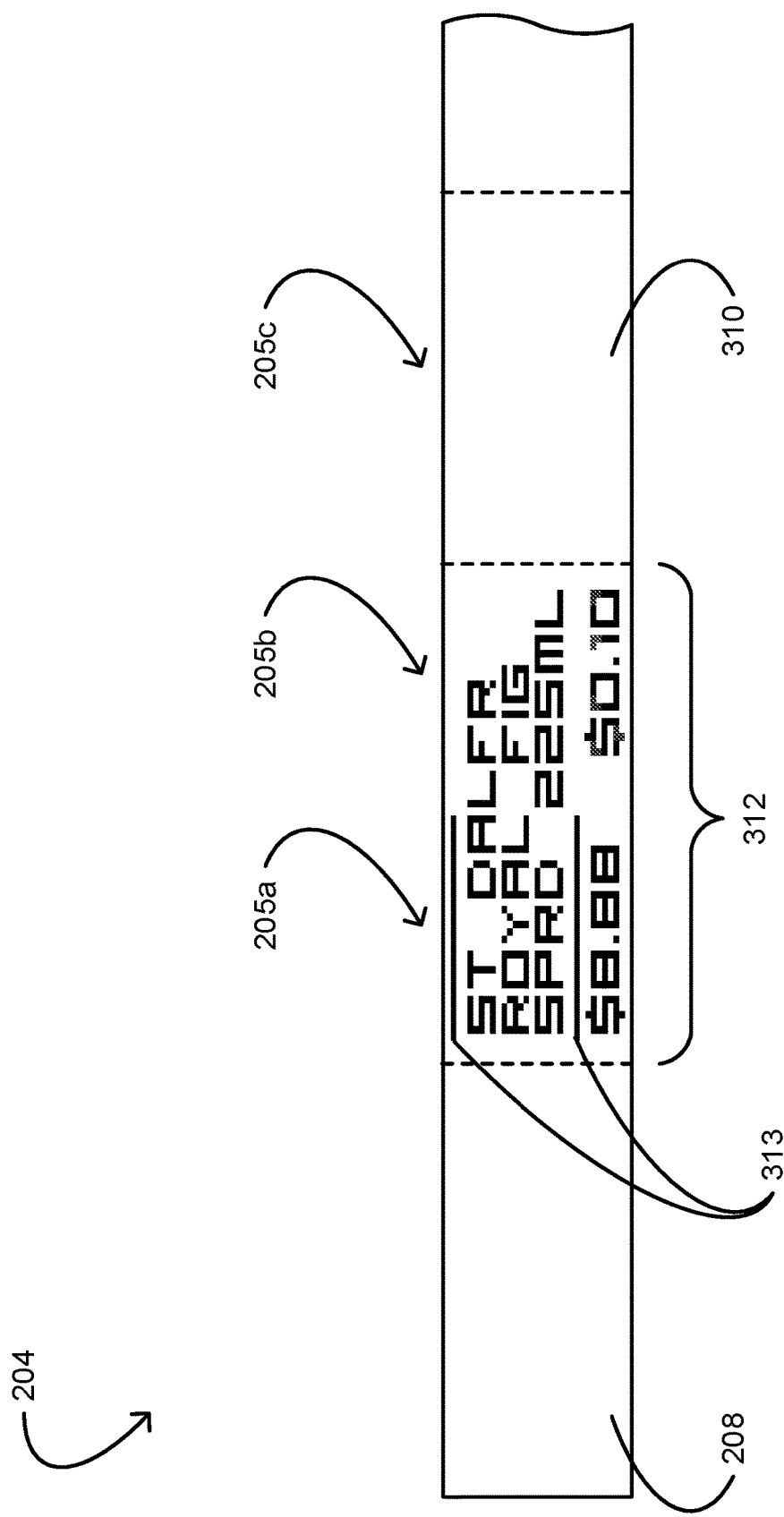
FIG. 3A illustrates a fascia with a shared electronic shelf tag having a first screen in accordance with some embodiments.
Figure 3B:
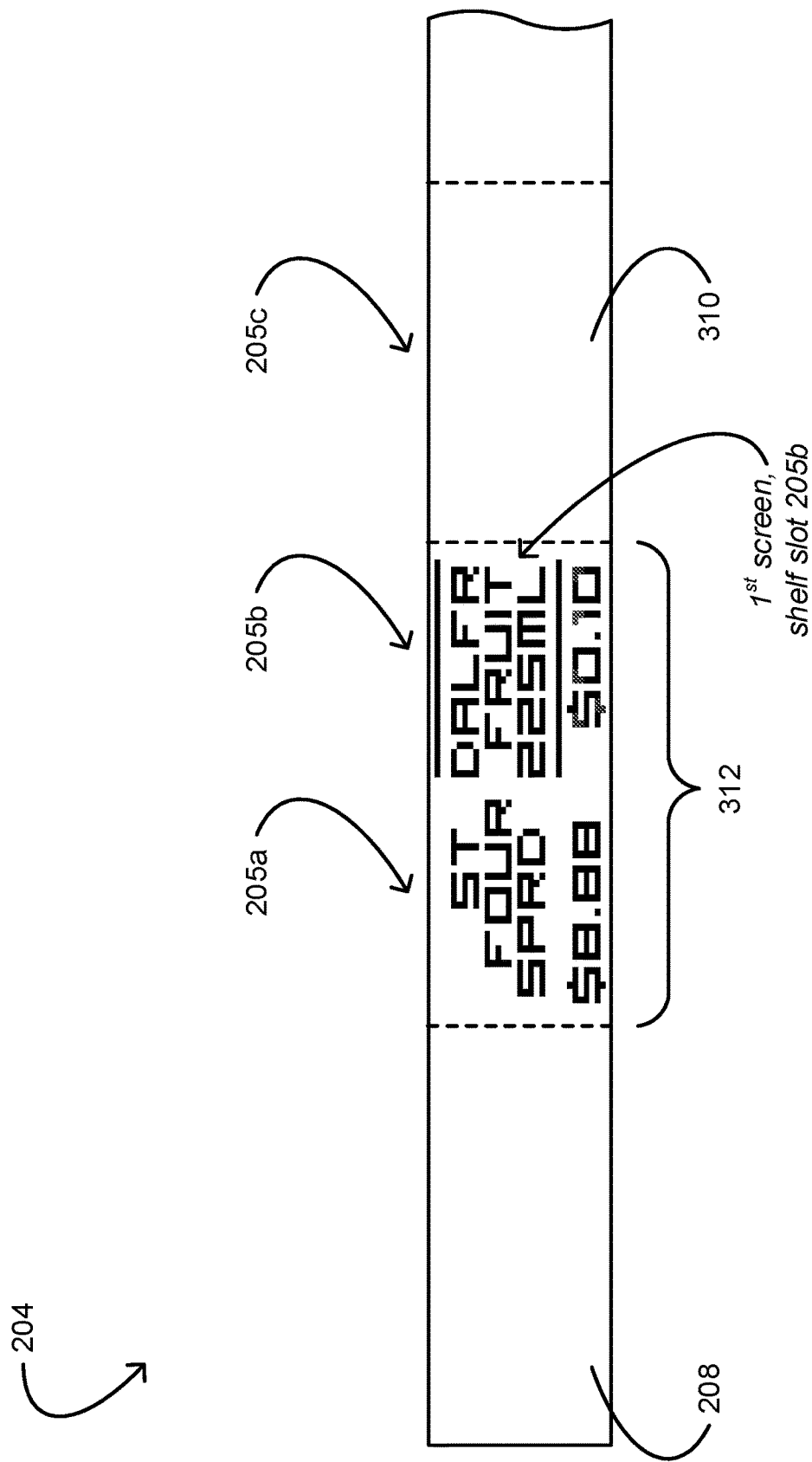
FIG. 3B illustrates the fascia with the shared electronic shelf tag of FIG. 3A having a second screen in accordance with some embodiments.
Figure 3C:
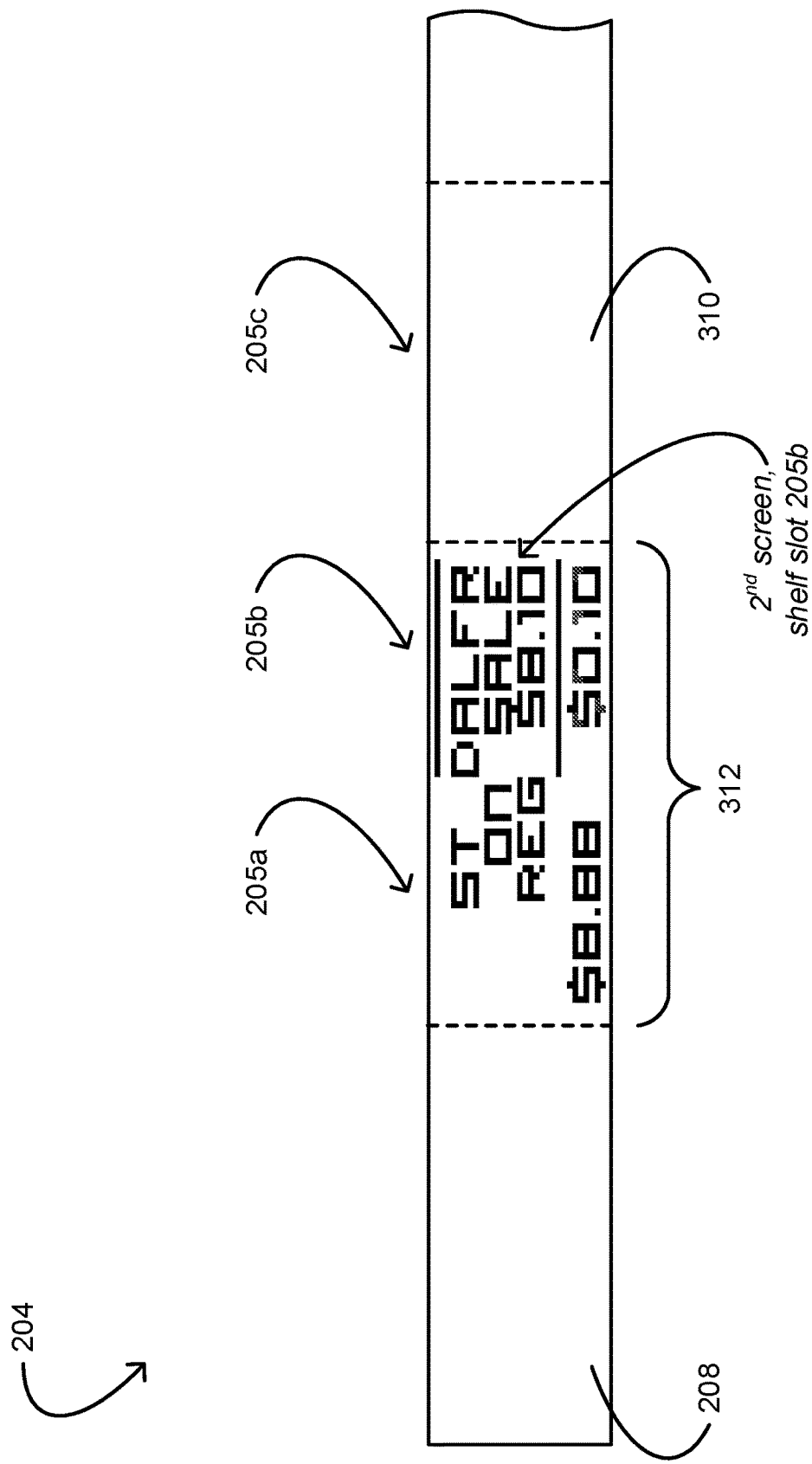
FIG. 3C illustrates the fascia with the shared electronic shelf tag of FIG. 3A having a third screen in accordance with some embodiments.

FIGS. 3A-3C illustrate the fascia 208 with an individual electronic shelf tag 310 and a shared electronic shelf tag 312 having different screens in accordance with some embodiments.

As shown, the two consecutive shelf slots 205a and 205b are dimensioned for stocking relatively narrow products and, therefore, each shelf slot of the shelf slots 205a and 205b benefits from using the shared electronic shelf tag 312.

The shared electronic shelf tag 312 can be configured to sequentially indicate each shelf slot of two or more consecutive shelf slots (e.g., the shelf slots 205a and 205b) by displaying a corresponding indicator 313, thereby indicating each product stocked in the two or more consecutive shelf slots. FIG. 3A shows the indicator 313 in line with the shelf slot 205a, and FIGS. 3B and 3C show the indicator 313 in line with the shelf slot 205b.

The shared electronic shelf tag 312 can also be configured to sequentially display in sequential screens individualized product information for each product stocked in the two or more consecutive shelf slots (e.g., the shelf slots 205a and 205b). As shown, such product information can include, but is not limited to, product name, product description, and amount of product. Furthermore, such product information can be displayed in one or more screens per product. This is shown between FIGS. 3B and 3C, wherein a first screen can be configured to display product name, product description, and amount of product, and wherein a second screen can be configured to display sale information for the product. The individualized product information for each product can be displayed for about 1 to 30 seconds, including about 1 to 20 seconds, such as about 1 to seconds, for example, about 3 to 10 seconds; however, the shared electronic shelf tag can be configured to display a persistent sale price for each product stocked in the two or more consecutive shelf slots.

FIGS. 4A-4E illustrate the fascia 208 with a shared electronic shelf tag 412 having different screens in accordance with some embodiments.

As shown, three consecutive shelf slots 205a, 205b, and 205c are dimensioned for stocking relatively narrow products and, therefore, each shelf slot of the shelf slots 205a, 205b, and 205c benefits from using the shared electronic shelf tag 412.

Figure 4A:
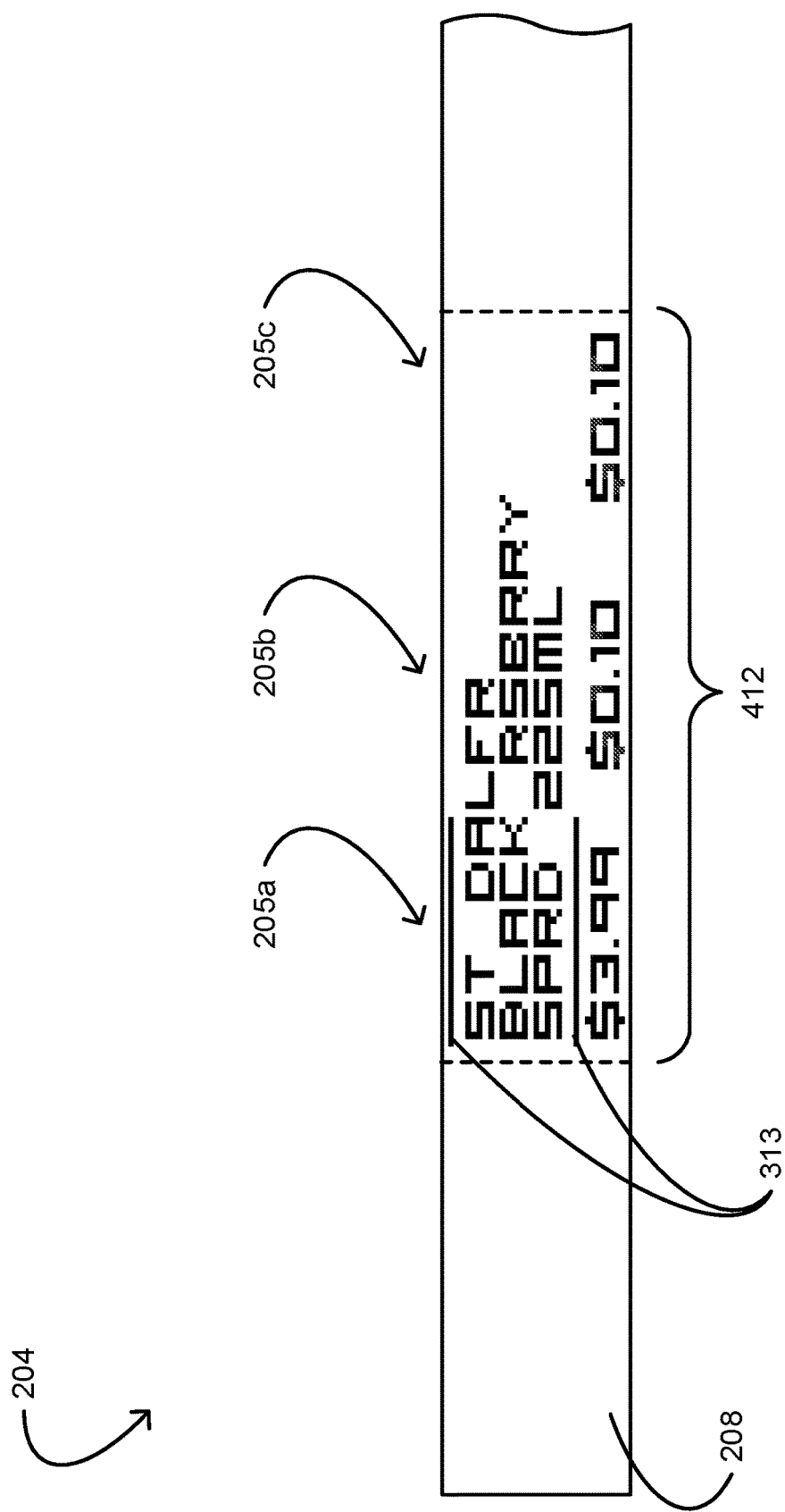
FIG. 4A illustrates a fascia with a shared electronic shelf tag having a first screen in accordance with some embodiments.
Figure 4B:
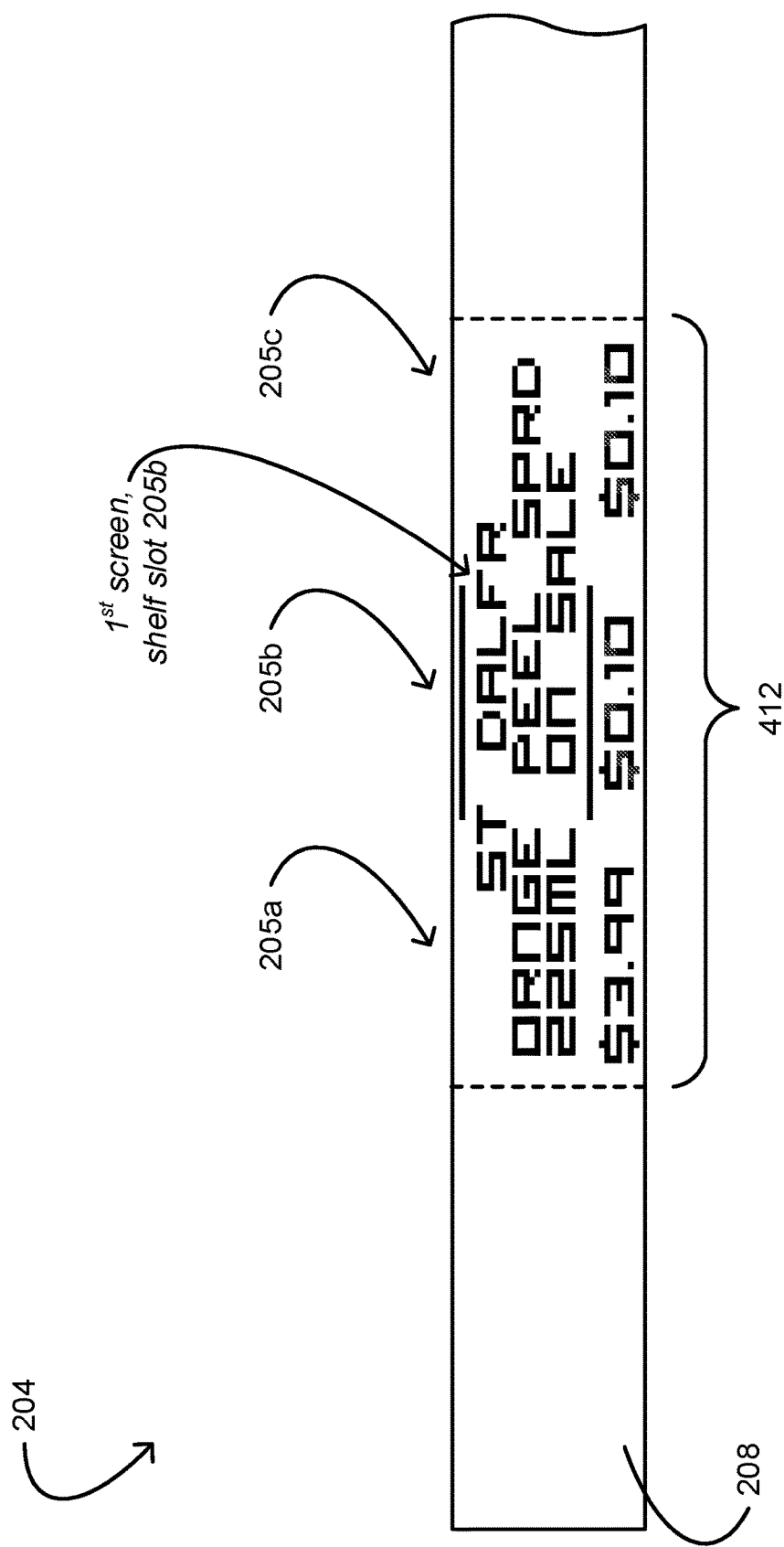
FIG. 4B illustrates the fascia with the shared electronic shelf tag of FIG. 4A having a second screen in accordance with some embodiments.
Figure 4C:
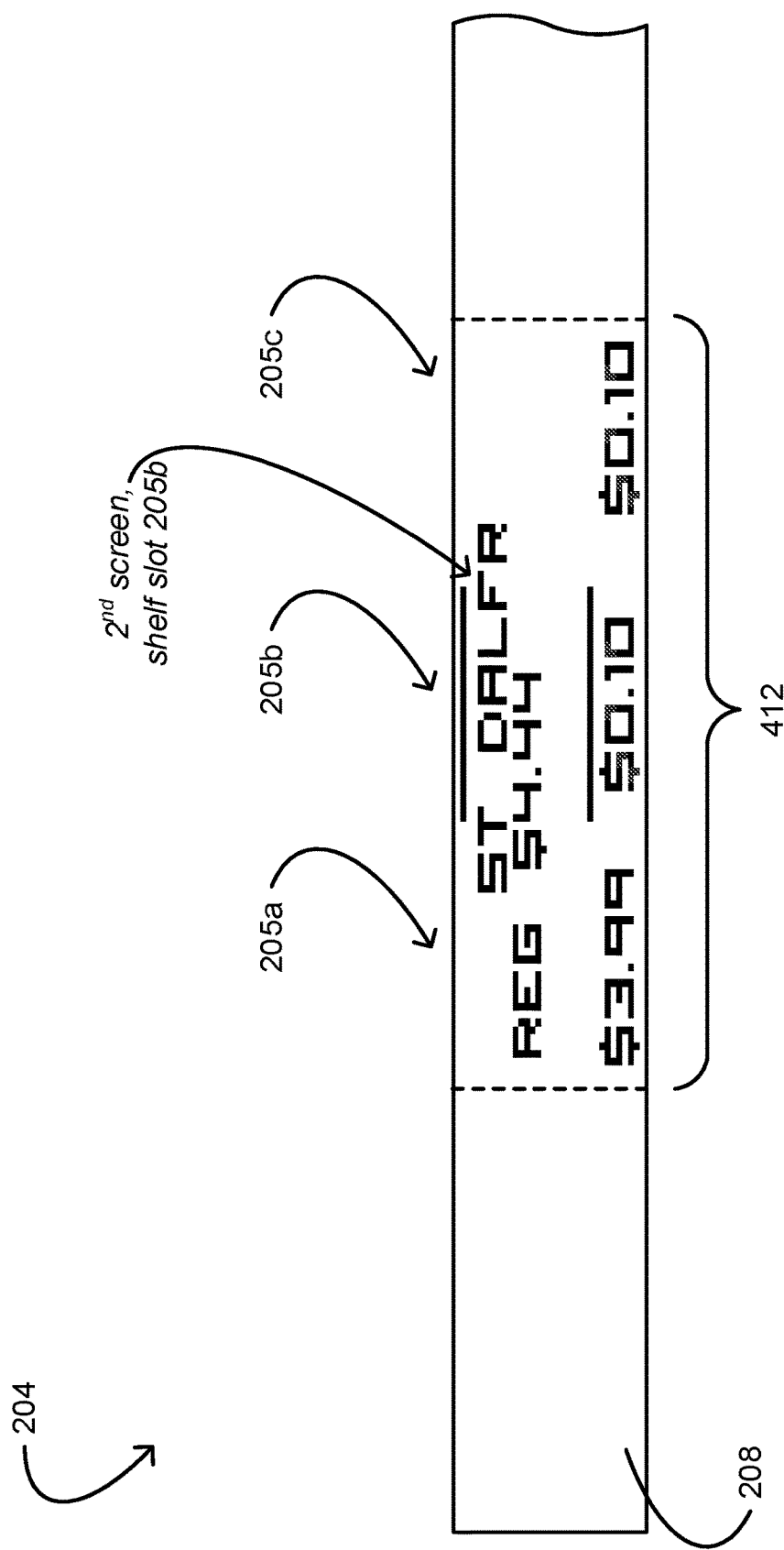
FIG. 4C illustrates the fascia with the shared electronic shelf tag of FIG. 4A having a third screen in accordance with some embodiments.
Figure 4D:
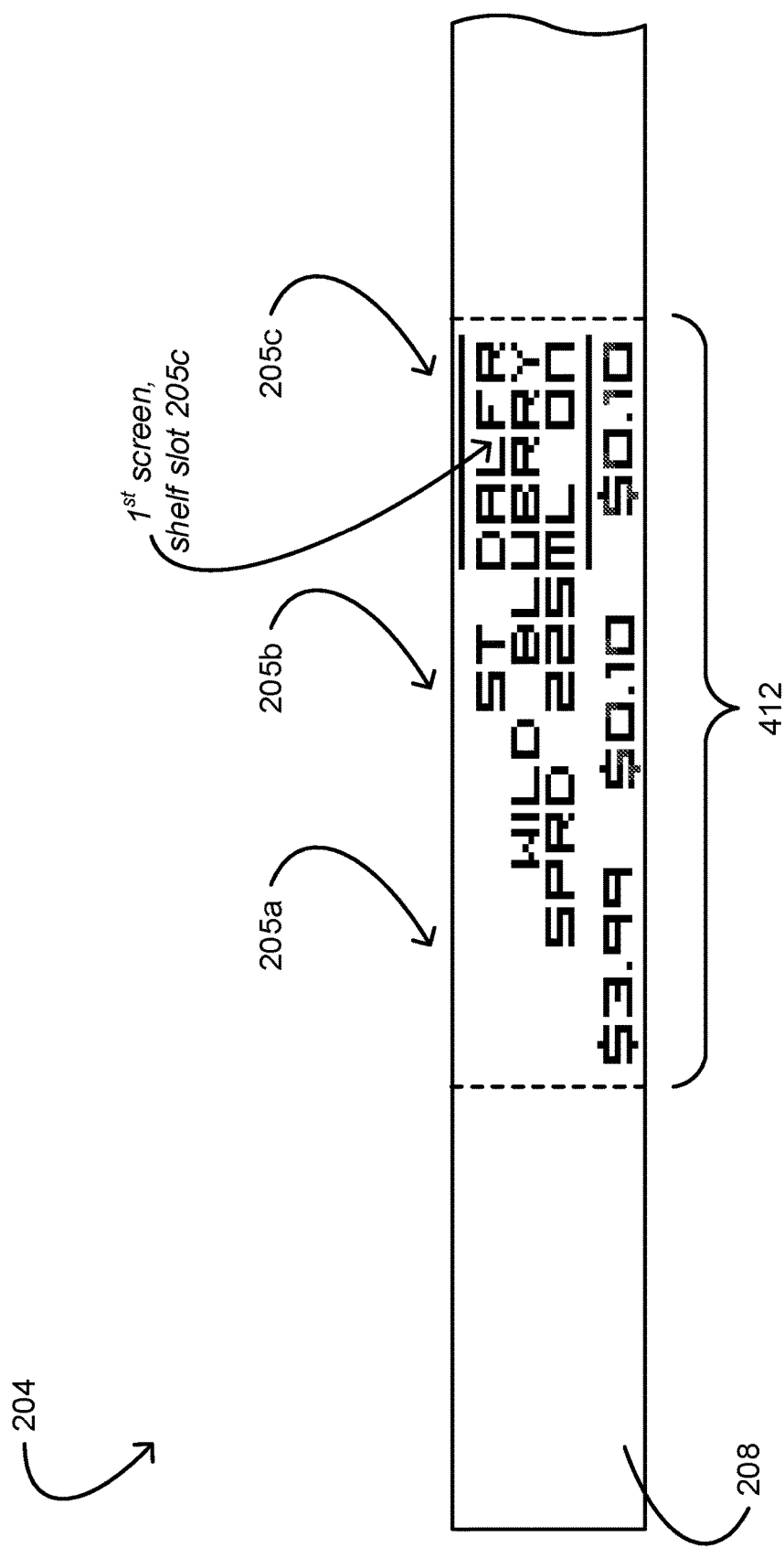
FIG. 4D illustrates the fascia with the shared electronic shelf tag of FIG. 4A having a fourth screen in accordance with some embodiments.
Figure 4E:
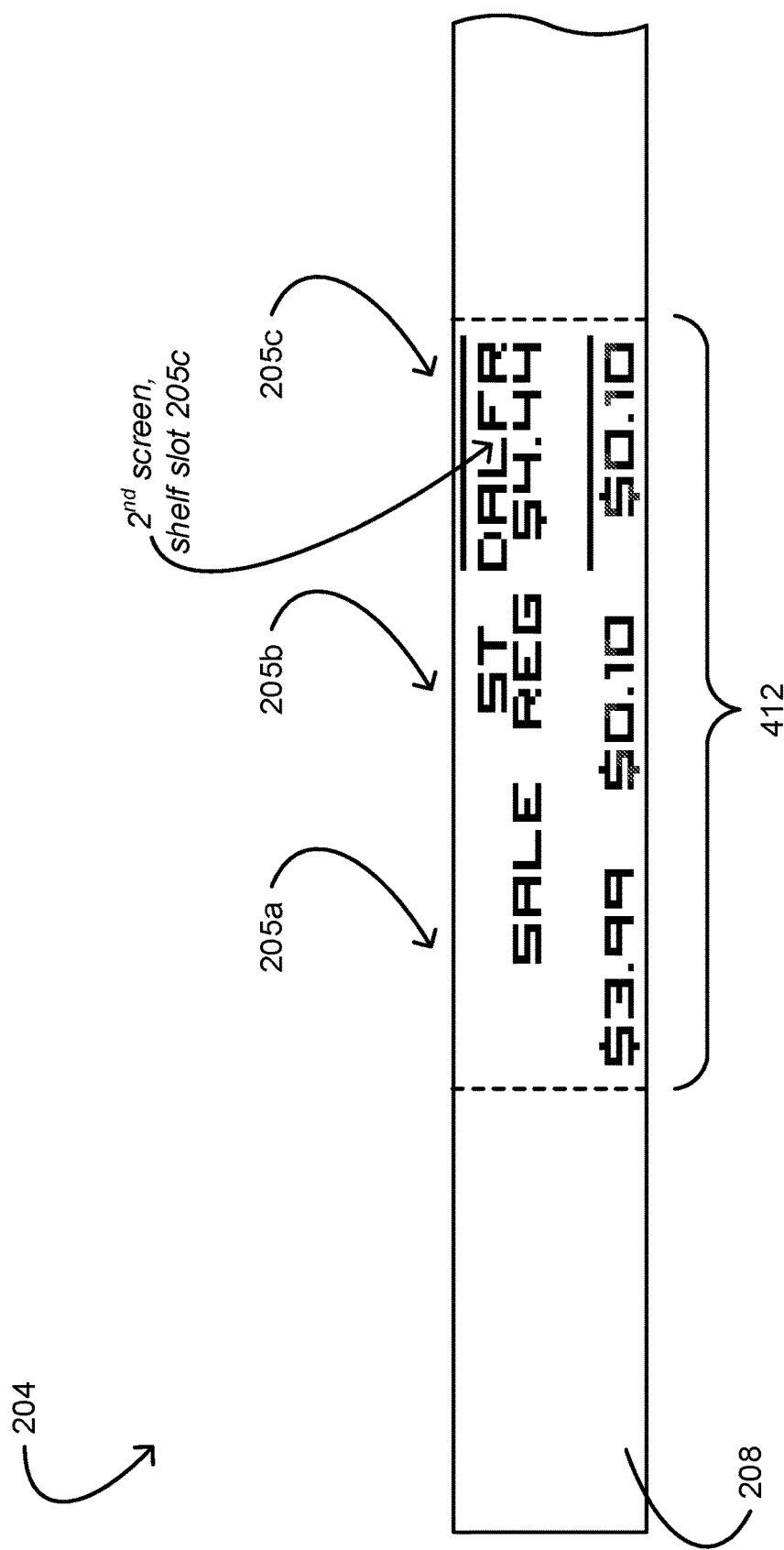
FIG. 4E illustrates the fascia with the shared electronic shelf tag of FIG. 4A having a fifth screen in accordance with some embodiments.

Like the shared electronic shelf tag 312, the shared electronic shelf tag 412 can be configured to sequentially indicate each shelf slot of three or more consecutive shelf slots (e.g., the shelf slots 205a, 205b, and 205c) by displaying the corresponding indicator 313, thereby indicating each product stocked in the three or more consecutive shelf slots. FIG. 4A shows the indicator 313 in line with the shelf slot 205a, FIGS. 4B and 4C show the indicator 313 in line with the shelf slot 205b, and FIGS. 4D and 4E show the indicator 313 in line with the shelf slot 205c.

Like the shared electronic shelf tag 312, the shared electronic shelf tag 412 can also be configured to sequentially display in sequential screens individualized product information for each product stocked in the three or more consecutive shelf slots (e.g., the shelf slots 205a, 205b, and 205c). As shown, such product information can include, but is not limited to, product name, product description, and amount of product. Furthermore, such product information can be displayed in one or more screens per product. This is shown between FIGS. 4B and 4C and between FIGS. 4D and 4E, wherein a first screen can be configured to display product name, product description, and amount of product, and wherein a second screen can be configured to display sale information for the product. The individualized product information for each product can be displayed for about 1 to 30 seconds, including about 1 to 20 seconds, such as about 1 to seconds, for example, about 3 to 10 seconds; however, the shared electronic shelf tag can be configured to display a persistent sale price for each product stocked in the three or more consecutive shelf slots.

The electronic shelf-tag system can further include a proximity detection system including the proximity camera 107 configured to detect one or more proximate persons (e.g., one or more persons proximate to the shelving unit 102). The LED array can be configured to display the persistent sale price for each product stocked in the consecutive shelf slots as well as at least the product information for a first product of each electronic shelf tag upon the proximity detection system detecting one or more proximate persons.

FIG. 5 illustrates a flow chart 500 for generating and displaying shared electronic tags of the electronic shelf-tag system in accordance with some embodiments.

As shown, a data source 510 or a number of such data sources (e.g., wholesalers, distributors, manufacturers, etc.) can supply product information to a backend system 520 through a communication interface 521, which product information can be subsequently stored in a persistent data store of product information 522 (e.g., a memory of the backend system 520). The product information can be supplied to electronic shelf-tag generation logic 524 (e.g., a program on the backend system 520), and, in cooperation with a processor 526, the electronic shelf-tag generation logic 524 can be configured to generate electronic shelf tags including the shared electronic shelf tags. The electronic shelf tags can be stored in a tag store 528 for subsequent communication to another computer (e.g., a personal computer, a handheld personal computer such as a smartphone mobile, etc.) or an Internet of Things ("IoT") device 530, or one or more displays 540, by way of a communication interface 529. The electronic shelf-tag generation logic 524 can be configured to automatically group any two or more products respectively stocked in two or more consecutive shelf slots to share a shared electronic shelf tag on one or more displays 540 (e.g., LED arrays). The automatic grouping can be based upon a product mapper, planogram information in the electronic shelf-tag system, or the like. That said, the electronic shelf-tag system can be alternatively configured or further configured to accept operator input from the other computer or the Internet of Things ("IoT") device 530 for manually grouping any two or more products respectively stocked in two or more consecutive shelf slots to share the shared electronic shelf tag on the one or more displays 540. When the electronic shelf-tag system is further configured to accept operator input for manually grouping any two or more products respectively stocked in two or more consecutive shelf slots, the operator input can be used to override automatic grouping of any two or more products by the electronic shelf-tag system.

Methods

A method of the electronic smart-shelf system 100 includes, in some embodiments, displaying product information in the shared electronic shelf tag 312 or 412 on the LED array coupled to a fascia (e.g., one fascia of the fasciae selected from fascia 108*a*, the fascia 108*b*, . . . , the fascia 108*n*) mounted to the shelf (e.g., one shelf of the shelves selected from the shelf 104*a*, the shelf 104*b*, . . . , the shelf 104*n*)) of the shelving unit 102. The product information is for two or more products of the inventory 112 respectively stocked in two or more consecutive shelf slots of the number of shelf slots 205. A horizontal resolution of a portion of the LED array corresponding to at least one shelf slot of the two or more consecutive shelf slots is insufficient for displaying the product information for the product stocked in the at least one shelf slot.

The method further includes sequentially indicating with the shared electronic shelf tag 312 or 412 each shelf slot of the two or more consecutive shelf slots by displaying the corresponding indicator 313.

The method further includes sequentially displaying with the shared electronic shelf tag 312 or 412 individualized product information for each product of the two or more products respectively stocked in the two or more consecutive shelf slots.

The method further includes displaying with the shared electronic shelf tag 312 or 412 the individualized product information for each product of the two or more products in one or more screens. The individualized product information for each product is displayed for about 3-10 seconds.

The method further includes displaying with the shared electronic shelf tag 312 or 412 a persistent sale price for each product of the two or more products respectively stocked in the two or more consecutive shelf slots.

The method further includes automatically grouping with the electronic shelf-tag system the two or more products respectively stocked in the two or more consecutive shelf slots to share the shared electronic shelf tag 312 or 412. The method further includes accepting by the electronic shelf-tag system operator input for manually grouping the two or more products respectively stocked in the two or more consecutive shelf slots to share the shared electronic shelf tag 312 or 412.

The method further includes detecting one or more persons proximate to the shelving unit 102 with the proximity detection system. The method further includes displaying on the LED array at least the product information upon the proximity detection system detecting one or more persons proximate to the shelving unit 102.

While some particular embodiments have been disclosed herein, and while the particular embodiments have been disclosed in some detail, it is not the intention for the particular embodiments to limit the scope of the concepts provided herein. Additional adaptations or modifications can appear to those of ordinary skill in the art, and, in broader aspects, these adaptations and/or modifications are encompassed as well. Accordingly, departures can be made from the particular embodiments disclosed herein without departing from the scope of the concepts provided herein.

What is claimed is:

1. An electronic shelf-tag system, comprising:
   a fascia configured to mount to a shelf of a shelving unit; and
   a light-emitting diode ("LED") array coupled to the fascia,
   wherein, in response to the horizontal resolution of a portion of the LED array being insufficient for displaying product information for a product stocked in at least one shelf slot, the LED array is configured to generate a shared electronic shelf tag across two or more consecutive shelf slots configured to:
      display product information for two or more products respectively stocked in the two or more consecutive shelf slots; and
      wherein a cabinet display top is configured to display visual content comprising an animated or graphical image file;
   wherein the shared electronic shelf tag is configured to:
      sequentially indicate each shelf slot of the two or more consecutive shelf slots by displaying a corresponding indicator, indicating each product stocked in the two or more consecutive shelf slots; and
      display a persistent sale price for each product of the two or more products respectively stocked in the two or more consecutive shelf slots;
   a proximity detection system configured to detect one or more persons proximate to the shelving unit, wherein the LED array is configured to display at least the product information upon the proximity detection system detecting one or more persons proximate to the shelving unit;
   the proximity detection system comprising a proximity camera;
   a facial recognition camera coupled to a portion of the shelving unit;
   a memory coupled to a processor, the memory configured to store one or more electronic shelf tags in a tag store for subsequent communication to another device or one or more displays by way of a communication interface;
   the memory further comprising electronic shelf tag generation logic configured to group two or products in two or more consecutive shelf slots.

2. The electronic shelf-tag system of claim 1, wherein the shared electronic shelf tag is configured to display the individualized product information for each product of the two or more products in one or more screens.

3. The electronic shelf-tag system of claim 1, wherein the individualized product information for each product is displayed for about 3-10 seconds.

4. The electronic shelf-tag system of claim 1, wherein the electronic shelf-tag system is configured to automatically group the two or more products respectively stocked in the two or more consecutive shelf slots to share the shared electronic shelf tag.

5. The electronic shelf-tag system of claim 1, wherein the electronic shelf-tag system is configured to accept operator input for manually grouping the two or more products respectively stocked in the two or more consecutive shelf slots to share the shared electronic shelf tag.

6. The electronic shelf-tag system of claim 1, wherein the two or more products respectively stocked in the two or more consecutive shelf slots are three or more products respectively stocked in three or more consecutive shelf slots.

7. An electronic shelf-tag system, comprising:
a fascia configured to mount to a shelf of a shelving unit;
a light-emitting diode ("LED") array coupled to the fascia,
wherein, in response to the horizontal resolution of a portion of the LED array being insufficient for displaying product information for a product stocked in at least one shelf slot, the LED array is configured to generate a shared electronic shelf tag across two or more consecutive shelf slots configured to:
display product information for two or more products respectively stocked in the two or more consecutive shelf slots for a pre-determined time period;
wherein the shared electronic shelf tag is further configured to sequentially display individualized product information for each product of the two or more products respectively stocked in the two or more consecutive shelf slots,
sequentially indicate each shelf slot of the two or more consecutive shelf slots by displaying a corresponding indicator, indicating each product stocked in the two or more consecutive shelf slots;
and
wherein the shared electronic shelf tag is still further configured to display a persistent sale price for each product of the two or more products respectively stocked in the two or more consecutive shelf slots; and
a proximity detection system configured to detect one or more persons proximate to the shelving unit,
wherein the LED array is configured to display at least the product information upon the proximity detection system detecting one or more persons proximate to the shelving unit; and
the proximity detection system comprising a proximity camera;
a facial recognition camera coupled to a portion of the shelving unit;
wherein a cabinet display top is configured to display visual content comprising inventory located on one or more shelves; and
a memory coupled to a processor, the memory configured to store one or more electronic shelf tags in a tag store for subsequent communication to another device or one or more displays by way of a communication interface; and the memory further comprising electronic shelf tag generation logic configured to group two or products in two or more consecutive shelf slots.

8. A method of an electronic shelf-tag system, comprising:
displaying a plurality of product information in a shared electronic shelf tag on a light-emitting diode ("LED") array coupled to a fascia mounted to a shelf of a shelving unit,
wherein the plurality of product information is associated with two or more products respectively stocked in two or more consecutive shelf slots, and
wherein a horizontal resolution of a portion of the LED array corresponding to at least one shelf slot of the two or more consecutive shelf slots is insufficient for displaying the product information for the product stocked in the at least one shelf slot;
wherein a cabinet display top is configured to display visual content that extends along the length of one or more shelves;
sequentially indicating each shelf slot of the two or more consecutive shelf slots by displaying a corresponding indicator configured to indicate each product stocked in the two or more consecutive shelf slots;
detecting one or more persons proximate to the shelving unit using a proximity detection system, wherein the LED array is configured to display at least the product information upon the proximity detection system detecting one or more persons proximate to the shelving unit;
the proximity detection system comprising a proximity camera;
recognizing one or more faces using a facial recognition camera coupled to a portion of the shelving unit;
a memory coupled to a processor, the memory configured to store one or more electronic shelf tags in a tag store for subsequent communication to another device or one or more displays by way of a communication interface; and
the memory further comprising electronic shelf tag generation logic configured to group two or products in two or more consecutive shelf slots.

9. The method of claim 8, further comprising sequentially displaying with the shared electronic shelf tag individualized product information for each product of the two or more products respectively stocked in the two or more consecutive shelf slots.

10. The method of claim 9, further comprising displaying with the shared electronic shelf tag the individualized product information for each product of the two or more products in one or more screens, wherein the individualized product information for each product is displayed for about 3-10 seconds.

11. The method of claim 8, further comprising detecting one or more persons proximate to the shelving unit.

12. The method of claim 11, further comprising displaying on the LED array at least the product information upon the proximity detection system detecting one or more persons proximate to the shelving unit.

13. The method of claim 8, further comprising accepting by the electronic shelf-tag system operator input for manually grouping the two or more products respectively stocked in the two or more consecutive shelf slots to share the shared electronic shelf tag.

* * * * *